United States Patent
Scherber et al.

(10) Patent No.: US 6,746,126 B2
(45) Date of Patent: Jun. 8, 2004

(54) VEHICLE INTERIOR TRIM HAVING A REDUCED GLARE EFFECT AT THE WINDSHIELD AND THE REAR VIEW WINDOW

(75) Inventors: Werner Scherber, Bermatingen (DE); Jochen Haering, Constance (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/957,927

(22) Filed: Sep. 21, 2001

(65) Prior Publication Data

US 2002/0109919 A1 Aug. 15, 2002

(30) Foreign Application Priority Data

Sep. 22, 2000 (DE) .......................... 100 46 982

(51) Int. Cl.$^7$ .............................. G02B 27/00
(52) U.S. Cl. .................. 359/613; 359/601; 359/606
(58) Field of Search ................. 359/601–614, 359/831–837; 296/96.19, 96.7, 70

(56) References Cited

U.S. PATENT DOCUMENTS

| | | | | |
|---|---|---|---|---|
| 3,549,469 A | * | 12/1970 | Wilfert | ............... 359/613 |
| 5,316,359 A | * | 5/1994 | Lansinger | ................ 296/40 |
| 6,217,176 B1 | * | 4/2001 | Maekawa | ............... 359/601 |
| 6,299,231 B1 | * | 10/2001 | Reitz | ................ 296/97.7 |

FOREIGN PATENT DOCUMENTS

| | | | | |
|---|---|---|---|---|
| DE | 30 04 931 | * | 8/1981 | ............... 359/601 |
| DE | 19731389 | | 1/1999 | |
| JP | 8-159820 | * | 6/1996 | ............... 359/601 |
| JP | 2001-276725 | * | 10/2001 | ............... 359/601 |

OTHER PUBLICATIONS

English Abstract of Germany reference No. 19731389.

* cited by examiner

Primary Examiner—Thong Nguyen
(74) Attorney, Agent, or Firm—Davidson, Davidson & Kappel, LLC

(57) ABSTRACT

A vehicle interior trim which has a reduced glare effect at the windshield or the rear window, and comprises the following features:

a transparent surface layer (2) whose upper boundary surface (7) has a non-smooth structure, partial areas of the boundary surface (1) being inclined toward the windshield or the rear window;

a mat absorber layer (5) which is arranged underneath the surface layer (2);

a zone which is situated between the surface layer (2) and the absorber layer (5) and which has a total reflection effect for light beams impinging into the vehicle interior at flat angles from outside;

a device (7,8,9) for scattering the light so that a natural lightness appearance ensues for the vehicle passenger.

14 Claims, 2 Drawing Sheets

VEHICLE INTERIOR TRIM HAVING A REDUCED GLARE EFFECT AT THE WINDSHIELD AND THE REAR VIEW WINDOW

BACKGROUND INFORMATION

The present invention relates to a vehicle interior trim having a reduced glare effect at the windshield or the rear window.

Light color shades in the interior of a passenger car give an ambience that appears particularly valuable, generous, and friendly and are therefore regarded as a preferred measure of design. A light interior trim is frequently used as an option in shows cars on fairs, etc. to emphasize the valuable character of the vehicle.

However, a light interior trim is of interest not only because of design aspects, it also offers practical advantages due to the reduced sensitivity to dust and dirt as well as a considerable improvement of the climatic comfort due to the reduced heating during direct insolation.

On the other hand, light surfaces, in particular in the region of the front and rear shelves, produce disturbing reflections in the panes, thus drastically reducing the perception security in unfavorable conditions. This is one of the reasons why light vehicle interior trims have hardly played a role in series application.

It is known to solve this problem by dereflecting measures at the panes themselves. However, these techniques have not gained acceptance in practice. Antireflective coats as are used in the improvement of spectacle lenses or photographic objectives would be very expensive if they were intended to be applied to large surfaces and to be neutral in color as well. The use of 'graded index' layers, i.e. surfaces having a smooth transition of the refractive index from glass (n=1.45) to air (n=1), would also be conceivable but virtually unusable since these surfaces have insufficient hardness and abrasion resistance and are very sensitive to dirt.

SUMMARY OF THE INVENTION

Therefore, an object of the present invention is to devise light, decoratively appealing surfaces for the vehicle interior which do not impair traffic safety due to an excessive glare effect at the panes.

The present invention provides a vehicle interior trim having a reduced glare effect at the windshield or the rear window, characterized by the following features: (a) a transparent surface layer (2) whose upper boundary surface (7) has a non-smooth structure, partial areas of boundary surface (1) being inclined toward the windshield or the rear window; (b) a mat absorber layer (5) which is arranged underneath the surface layer (2); (c) a zone which is situated between the surface layer (2) and the absorber layer (5) and which has a total reflection effect for light beams impinging into the vehicle interior at flat angles from outside; and (d) means (7,8,9) for scattering the light so that a natural lightness appearance ensues for the vehicle passenger.

Unlike the above mentioned, known measures which are directed to the pane itself, the present invention proposes to carry out the 'dereflection' by measures at the interior, namely at the locations which are reflected in the pane and able to blind the passengers. The interior trim according to the present invention is arranged, above all, in the region of the front shelf (instrument panel) and/or of the rear shelf.

Advantageously, the angular position, the extent and/or the number of surface elements of the surface layer (2) that are inclined toward the windshield may be used for controlling the intensity of the totally reflected light and, consequently, for adjusting the lightness appearance perceived by a vehicle passenger.

The zone featuring a total reflection effect may be formed by air gaps (4) situated between the surface layer (2) and the absorber layer (5).

The zone featuring a total reflection effect also may be constituted by transparent shaped bodies situated near or at the interface between the surface layer (2) and the absorber layer (5), the shaped bodies having a refractive index which is greater than the material of the surface layer (2). The shaped bodies may be designed in a pyramid-like, cone-like, lens-like, or irregular manner and have an essentially plane base.

The upper and/or the lower boundary surface(s) of the surface layer (2) may be regularly or irregularly structured for scattering the light, and may be structured in the form of prisms, cones, knobs, grooves or waves, or is/are irregularly grained.

For scattering the light, cavities or transparent scattering bodies (8) may be included in the surface layer (2) which have a refractive index which differs from the material of the surface layer (2).

The vehicle interior trim may have an at least partially polarizing effect, the polarization plane lying in the driver's plane of sight, and a polarization filter may be situated above or underneath the zone of the transparent scattering bodies (8) within the surface layer (2). Highly refractive fibers (9) also may produce a polarizing and at the same time scattering effect, and may be included within the surface layer (2) parallel to the driver's plane of sight.

Scattering bodies (8) or shaped bodies may be arranged within the surface layer (2) are larger than the light wavelength, preferably in the size range from 10 micrometers to 1 millimeter. The scattering bodies (8) or shaped bodies arranged within the surface layer (2) may be dyed in neutral gray or other light color shades.

BRIEF DESCRIPTION OF THE DRAWINGS

The present invention will be explained in greater detail in the light of exemplary embodiments with reference to the figures, in which.

DETAILED DESCRIPTION

Figure 1:
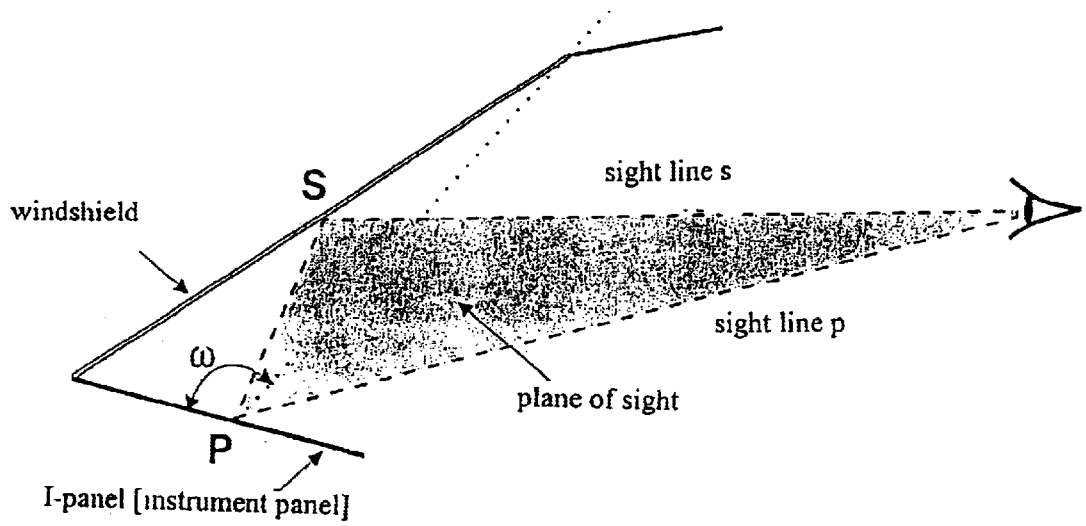
FIG. 1 is a schematic representation of the geometric conditions at the windshield.

FIG. 1 shows the geometric conditions at the front shelf of a motor vehicle as the most important case of use of the interior trim according to the present invention. The critical surfaces which are responsible for the glare are provided with a special, directional reflective behavior which, according to the present invention, fulfills the following conditions: for each critical point P of the shelf (I-panel), the light incident from solid angle ω is directed in such a manner that only a small amount of light propagates in the direction of reflection point S and reaches the vehicle passenger's eye via sight line s. From the remaining viewing angles, in particular from the passengers' position (sight line p), a light color appearance ensues which corresponds to or harmonizes with the surrounding materials.

It is immediately obvious that this requirement is not compatible with the normal optical properties of the known surfaces. White or light surfaces result from diffuse reflection of light and possess a diffuse (Lambert) reflection characteristic. In this manner, a large portion of the light gets into the direction of s independently of the direction of incidence, resulting in glare. Surfaces having a directional (specular) reflective behavior, generally referred to as mirrors, would of course also be unsuitable since here, possibly, a very high luminous intensity is directed in the direction of s or p and the problem would become dramatically more difficult. The reflective behavior of all common surfaces lies somewhere between the extreme values of ideally diffuse to specular. In the case of dark colors, in addition, the overall intensity of the scattered or reflected light is reduced by absorption effects, however, the angular distribution is not always changed.

Figure 2:
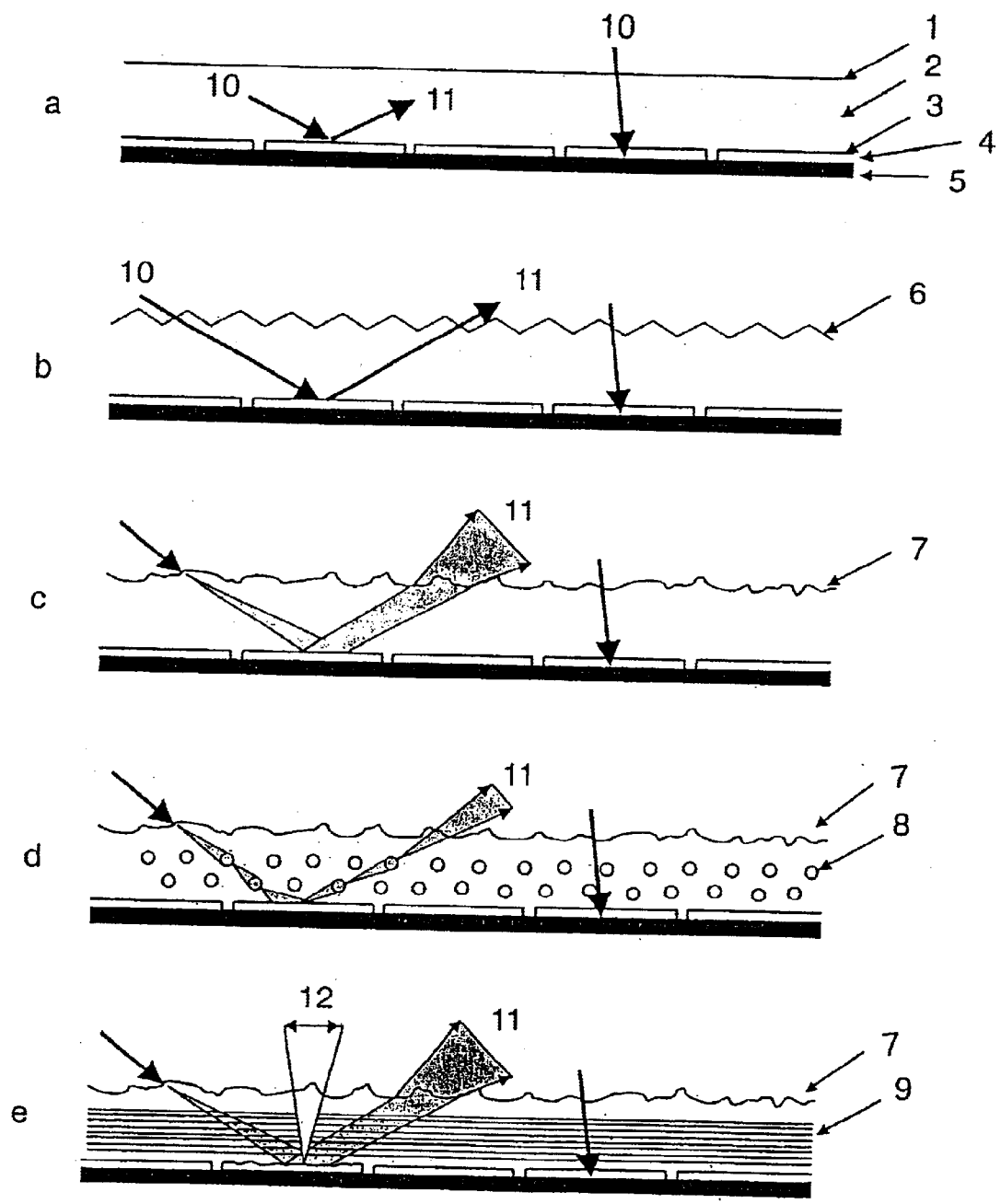
FIG. 2 shows cross-sections through the vehicle interior trim according to the present invention in different specific embodiments.

The abnormal directional distribution of the vehicle interior trim according to the present invention comes about by the interaction of several physical effects, which will be explained in greater detail with reference to FIG. 2. FIG. 2 shows several interior trims located on the front shelf of the vehicle.

First of all, the concept of 'second surface' (SS) will be introduced. The surface to be treated is coated with a light-transmissive surface layer 2 which is made of a flexible transparent plastic material, and which will also be referred to as light guide hereinafter, in such a manner that no longer the actual surface 1 but the second boundary surface (SS), i.e. lower side 3 of transparent surface layer 2, is responsible for the reflection of light. If the SS is not connected to the backing over the whole surface but only at a number of locations, and if, at the remaining locations, the SS is situated at a small distance from the backing (air gap), then the phenomenon of total reflection can be observed at this structure, i.e., beams 10 that are incident at flat angles are totally reflected 11 (100 percent) while light from steeper angles of incidence penetrates the boundary surface, being absorbed at a third (mat black) absorber layer 5. The reflection characteristic of this configuration already meets the above mentioned requirements in fundamental features but needs to be further developed according to the present invention.

According to fundamental laws of optics, as is generally known, it is not possible for light coming from outside to be totally reflected at a plane-parallel layer. Thus, the previous considerations only apply to light which were generated in light guide 2 itself. Along the lines of the problem definition, however, the intention is to convey a natural lightness effect which can only result from diffuse reflection or scattering of light from the surroundings. To this end, surface 6 (FIG. 2b) of transparent layer 2 is initially provided with a groove-shaped or conical structure. Now, it is possible for light 10 to penetrate at flat angles without any problem and to be totally reflected 11 at SS (surface 3), as shown in FIG. 2b. Beams impinging at steeper angles are nevertheless let through at SS and absorbed unless they exceed the critical angle of total reflection.

However, an arrangement according to FIG. 2b would not be suitable for use in practice because, from the passengers' viewing point, the surface exhibits a specular reflective behavior and would appear too light in response to an unfavorable incidence of light. A further basic idea of the present invention now is to scatter the excessive amount of light by further measures and optionally reduce it further so that a pleasant light, diffuse color appearance indeed ensues but disturbing light reflexes in the direction of s are nevertheless suppressed.

Because of the transition from the groove-shaped surface to a more waved or irregular surface 7, as exemplarily shown in FIG. 2c, it is possible for the degree of lightness and for the scattering to be gradually adjusted. The portion of surface elements which are oriented with a certain limiting angle to the left toward the direction of light incidence, that is toward the windshield (entrance aperture) is decisive for the lightness while the coarsely waved structure of the remaining surface elements contributes more to the scattering of the exiting beams 11. Totally reflected beams 11 will now either exit at surface 7 of light guide 2 or be totally reflected once more, depending on the angular position of the surface element. However, this effect is of no importance for the perceivable overall lightness of the arrangement since trapped light beams will exit again, even after multiple reflection, thus giving rise to a further welcomed scattering of light. Via the two parameters entrance aperture and beam deflection during the exit of the light from the structure, it is already possible to achieve very useful design approaches, given a suitable combination. The structure dimensions should be selected to be greater than the light wavelength but advantageously smaller than the resolution capacity of the eye so as not to generate disturbing patterns. A favorable dimensioning lies into range from 10 to 100 micrometers.

Besides the surface structure for light guide 2 depicted in FIG. 2c, the surface structure can also have small prisms, cones, knobs, grooves or waves, or be irregularly grained in another way.

Reference is made to the fact that the interior trim according to the present invention can perfectly have a grooved surface 6 according to FIG. 2b. To this end, it is only required to make additional preparations for scattering the light so that the desired natural lightness appearance ensues in lieu of an unwanted specular reflective behavior. Several examples of the scattering of light, which are provided in place of or in addition to the scattering of light at the upper surface of the light guide, will be described in the following.

In lieu of or in addition to scattering the light at the upper surface of light guide 2, a scattering of light can be achieved by structuring the lower side of light guide 2 in connection with which the same regularities apply.

The scattering of light or the "whitening" can alternatively or additionally be achieved by measures in the region of light guide 2 (FIG. 2d). By including transparent elements (scattering bodies), the beam is further fanned out due to refractive and scattering effects without losing lightness. Due to the fanning, additional (flat) angular ranges ensue which are totally reflected at SS; on the other hand, also generated angular ranges having a steeper incidence at SS are lost for the reflection, which, on average, cancels each other out. The scattering degree can be controlled via the number and the refractive index of the included elements, the difference between the refractive indices of the pigment material and transparent matrix 2 being decisive. Thus, both highly refractive scattering bodies, for example, made of $TiO_2$ and also embedded cavities or hollow balls are usable. The size of the scattering bodies is important in this connection. The size should preferably lie in the range of the forward scattering, that is a multiple of the light wavelength, typically a few micrometers. In the case of smaller dimensions, below 0.1 micrometers, the so-called "Rayleigh scattering" having an isotropic scattering angle distribution predominates, which would project a large portion of light in the direction of s, destroying the desired effect. Usable are, for example, grain-shaped or spherical scattering bodies but also irregularly oriented transparent fibers. Besides, it is, of course, also possible and, with respect to the desired effect, non-prejudicial for the inclusions or for the entire matrix 2 to be slightly dyed to achieve color tones matching the remaining interior or the vehicle's paint coat or for absorbing excessive luminous intensity.

The measure of scattering by embedded bodies (FIG. 2d) has to be used with care since not only the described effects of refraction and forward scattering take effect but also the effect of Fresnel reflection, i.e., at each scattering body, a small portion is reflected due to the variation in the optical density, thus getting into the direction of s as well. By means of a further embodiment of the present invention, which is exemplarily shown in FIG. 2e, it is possible to suppress these unavoidable reflexes. The basis of this design approach is the discovery that the light beams from the instrument panel which are responsible for the blinding of the driver impinge on the windshield within a relatively limited angular range of approximately 50 to 70° (cf. FIG. 1). It is known from optics that the reflectance of light impinging on a glass pane at an angle is strongly dependent on the polarization direction. The difference is particularly large at the so-called "Brewster angle" at which the light wave which is polarized parallel to the plane of incidence is completely suppressed. The Brewster angle for a glass-air interface lies at 56°. Thus, the desired directional selectivity between sight lines p and s can be further increased by polarizing the spurious radiation coming from the scattering bodies. For instance, a conventional polarization filter can be installed above or underneath the scattering zone. In this connection, the polarization plane lies in the driver's plane of sight which is defined by the driver's direction of view and the point of the vehicle interior which is reflected there. Due to their functioning, the mentioned polarization filters have a general darkening by approximately 50 percent. However, since sufficient light can be guided in, given an appropriate dimensioning of the other structuring measures described above, the desired light color appearance can be readily attained. A variant of this technique consists in that, in place of a polarization filter, fibers 9 which are oriented toward the plane of sight are used. Due to the multiple scattering (diffuse reflection) and the above mentioned Brewster effect, exiting beams are preferably polarized in fiber direction and therefore are not visible in sight line s. A further differentiation ensues with respect to the angles of incidence and reflection since, in the fiber geometry, the Brewster angle occurs statistically less frequently for flat angles 10 and 11 than for steeper angles in range 12. Here too, it is useful to slightly dye the fibers 9. Besides the decorative effect, this measures even intensifies the degree of polarization.

The measures so far described are perfectly compatible with the usual manufacturing processes of instrument panels for motor vehicles: use of pigmented plastics or fiber composite plastics, laminating, bonding, deep drawing, back injection, in-mold techniques, etc. The production of the air gaps appears to be unusual but capable of being mastered from a standpoint of production engineering. Since the air gaps need not to have a defined spacing, it is sufficient for the connection between the light guide and the absorber to be interrupted at a number of locations or to be adjusted in a such a manner that it is not permanent, for instance, by introducing anti-adhesive or separating agents which prevent the companion materials from being wetted during the connecting process. The number and extent of the supporting locations need to be adjusted in such a manner that a mechanically stable structure ensues; on the other hand, that sufficient light can be reflected for the desired color shade. It is advantageous to select the supporting locations and their spacing to be very small, for example, in the millimeter range or less so as not to give rise to a texture that is discernible by the eye. Remaining inhomogeneities are equalized by pigmentation and other, above described measures for beam fanning.

Figure 3:
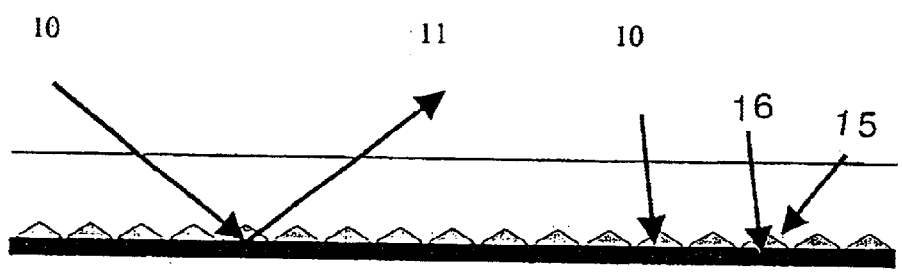
FIG. 3 depicts an alternative embodiment of the vehicle interior trim according to the present invention.

A further variant according to the present invention includes using prismatic inclusions in place of the air gaps, the refractive index of the prismatic inclusions lying considerably above that of the light guide material. The coupling-in and total reflection effects described above for the entire light guide layer (FIGS. 2b and 2c) apply correspondingly to highly refractive elements which are fixedly integrated at the interface between the light guide and the absorber. This arrangement is schematically shown in FIG. 3. The interrelationships already mentioned are valid for the dimensioning of the prism elements 15 as well, i.e., they should preferably be dimensioned very small but larger than the light wavelength. From a standpoint of production engineering base lengths of 10 micrometers to 1 millimeter appear to be advantageous. The prisms 15 can have the shape of a pyramid, a cone or of a lens, or possess an irregular surface. It is merely important that the lower side (base) 16 of the elements have a plane design. It is advantageous for the base to run essentially parallel to the backing. If the shape of the front shelf differs more strongly from the simple geometry depicted in FIG. 1, the inclination of base surfaces relative to the backing can be used as a further measure for optimum conduction and distribution of light.

What is claimed is:

1. A vehicle interior trim having a reduced glare effect at the windshield or the rear window comprising:

a transparent surface layer having an upper boundary surface, the upper boundary surface having a non-smooth structure, portions of the boundary surface being inclined toward the windshield or the rear window;

a mat absorber layer arranged underneath the surface layer; and a zone situated near or at an interface between the transparent surface layer and the absorber layer, the zone having a total reflection effect for light beams impinging into the vehicle interior at a first angle from outside; and means for scattering the light so that the trim has a lightness appearance.

2. The vehicle interior trim as recited in claim 1 wherein the zone featuring a total reflection effect is formed by air gaps situated between the surface layer and the absorber layer.

3. The vehicle interior trim as recited in claim 1 wherein the zone featuring a total reflection effect is constituted by transparent shaped bodies situated near or at the interface between the surface layer and the absorber layer, the shaped bodies having a refractive index which is greater than a material of the surface layer.

4. The vehicle interior trim as recited in claim 3 wherein the shaped bodies are designed in a pyramid-like, cone-like, lens-like, or irregular manner and have a plane base.

5. The vehicle interior trim as recited in claim 1 wherein at least one of the upper boundary surface and a lower boundary surface of the surface layer is structured for scattering the light.

6. The vehicle interior trim as recited in claim 5 wherein at least one of the upper and the lower boundary surface of the surface layer is structured in the form of prisms, cones, knobs, grooves or waves, or is irregularly gained.

7. The vehicle interior trim as recited in claim 1 wherein, for scattering the light, cavities or transparent scattering bodies are included in the surface layer, the cavities or scattering bodies having a refractive index differing from the material of the surface layer.

8. The vehicle interior trim as recited in claim 1 wherein the vehicle interior trim has a polarizing effect, and a polarization plane lying in a plane of sight of a driver.

9. The vehicle interior trim as recited in claim 8 further comprising fibers oriented in the plane of sight so as to create a polarization filter within the surface layer.

10. The vehicle interior trim as recited in claim 8 wherein highly refractive fibers which produce a polarizing and at the same time scattering effect are included within the surface layer parallel to a plane of sight of a driver.

11. The vehicle interior trim as recited in claim 1 wherein the means includes scattering bodies or shaped bodies arranged within the surface layer.

12. The vehicle interior trim as recited in claim 11 wherein the scattering bodies are in the size range from 10 micrometers to 1 millimeter.

13. The vehicle interior trim as recited in claim 11 wherein the scattering bodies or shaped bodies arranged within the surface layer are dyed in neutral gray or other light color shades.

14. A vehicle interior trim having a reduced glare effect at the windshield or the rear window comprising:
- a transparent surface layer having an upper boundary surface, the upper boundary surface having a non-smooth structure;
- a mat absorber layer arranged underneath the surface layer; and
- a zone situated near or at an interface between the transparent surface layer and the absorber layer, the zone having a total reflection effect for light beams impinging into the vehicle interior at a first angle from outside;
- the upper boundary surface having a non-smooth structure, portions of the boundary surface being inclined toward the windshield or the rear window so that the trim appears a different color than the mat absorber layer.

* * * * *